United States Patent
Johnson et al.

(10) Patent No.: US 10,449,477 B2
(45) Date of Patent: Oct. 22, 2019

(54) INTELLIGENT MUD-GAS SEPARATION AND HANDLING SYSTEM

(71) Applicant: SCHLUMBERGER TECHNOLOGY CORPORATION, Sugar Land, TX (US)

(72) Inventors: Ashley Johnson, Cambridge (GB); Jacques Orban, Katy, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 105 days.

(21) Appl. No.: 15/677,561

(22) Filed: Aug. 15, 2017

(65) Prior Publication Data
US 2019/0054406 A1 Feb. 21, 2019

(51) Int. Cl.
| | |
|---|---|
| B01D 15/08 | (2006.01) |
| B01F 1/00 | (2006.01) |
| B01D 45/16 | (2006.01) |
| B01D 45/06 | (2006.01) |
| G01F 1/00 | (2006.01) |
| B01J 19/00 | (2006.01) |
| E21B 43/34 | (2006.01) |

(52) U.S. Cl.
CPC ............. *B01D 45/16* (2013.01); *B01D 15/08* (2013.01); *B01D 45/06* (2013.01); *G01F 1/00* (2013.01); *B01J 19/00* (2013.01); *B01J 2219/00162* (2013.01); *E21B 43/34* (2013.01)

(58) Field of Classification Search
None
See application file for complete search history.

(56) References Cited

U.S. PATENT DOCUMENTS

| | | | | |
|---|---|---|---|---|
| 4,178,801 A | * | 12/1979 | Cassell | G01F 1/34 55/DIG. 34 |
| 4,721,516 A | * | 1/1988 | Barsacq | A47L 5/38 15/301 |
| 2005/0218074 A1 | * | 10/2005 | Pollock | C02F 3/1273 210/637 |
| 2008/0017558 A1 | * | 1/2008 | Pollock | B01D 61/18 210/90 |

* cited by examiner

*Primary Examiner* — Tam M Nguyen
(74) *Attorney, Agent, or Firm* — Rachel E. Greene (57) ABSTRACT

A multi-phase fluid solution measurement and gas separation system is described. The system includes a substantially vertical fluid supply pipe that introduces the multi-phase fluid solution in a steady flow having a substantially calm and steady fluid surface to a mud-gas separation unit. The mud-gas separation unit includes measurement tools such as force sensors and level sensors to allow for a rheological model of the fluid to be calculated. The system also includes components for flaring or processing gas which separates from the multi-phase solution.

8 Claims, 7 Drawing Sheets

INTELLIGENT MUD-GAS SEPARATION AND HANDLING SYSTEM

BACKGROUND

Many operations in the oilfield involve extracting a multi-phase flow from a formation which can contain uncertain quantities of mud, hydrocarbons, gas, debris, and other fluids. There are tools for knowing the precise quantity of each component in the multi-phase flow, such as a VX flow meter, but many of these methods are prohibitively expensive. Knowing the precise quantity of each component in the multi-phase flow without using expensive equipment can be a challenging proposition. Another challenge is to separate gas phase components of the fluid from the liquid phase components. There is a need in the art for an inexpensive, reliable method to ascertain the characteristics of a multi-phase fluid flow and separating gas from liquid phase components.

SUMMARY

Various features of the present disclosure are described herein with reference to the accompanying figures. Embodiments of the present disclosure are directed to a multi-phase fluid flow measurement system including a fluid supply pipe oriented in an at least partially vertical orientation. The fluid supply pipe can carry a multi-phase fluid upward through the fluid supply pipe. The multi-phase fluid has an upwardly-facing fluid surface. The system can also include a transfer pipe extending laterally from the fluid supply pipe. The multi-phase fluid is pressurized sufficiently to flow through the transfer pipe while the upwardly-facing fluid surface is steady and remains steady as it enters the transfer pipe. The system also has a Weir plate positioned to at least partially impede the flow of the multi-phase fluid through the transfer pipe. The system can have a level sensor in the mud-gas separator configured to measure a level of fluid accumulated in the mud-gas separator unit, and a controller configured to release at least one of fluid or gas from the mud-gas separator in response to the level sensor determining that the fluid level has reached a predetermined level.

Other embodiments of the present disclosure are directed to a method of measuring characteristics of a fluid in a multi-phase solution. The method includes conducting a multi-phase solution in a vertical direction such that the multi-phase solution forms an upwardly-facing, steady fluid surface, and flowing the multi-phase solution laterally through a transfer pipe. The transfer pipe is at least partially blocked by a Weir plate. The method also includes flowing the multi-phase solution over one or more baffles positioned at a downwardly sloping angle, and measuring a depth of the multi-phase solution as it flows over the baffles in at least one location. The method also includes allowing gas to escape the multi-phase solution and collecting the escaped gas.

In still further embodiments the present disclosure is directed to a mud-gas separation unit including an inlet configured to receive a steady flow of a multi-phase solution and a baffle having a force sensor. The baffle is positioned so that the steady flow impinges upon the baffle on an area affected by the force sensor. The mud-gas separation unit also includes a gas collection region above the inlet configured to allow gas to escape the multi-phase solution and collect in the gas collection region, and an articulating member operatively coupled to the baffle and configured to change an angle of the baffle.

DETAILED DESCRIPTION

Below is a detailed description of systems and methods for analyzing and separating fluids of different phases from a multi-phase fluid flow according to embodiments of the present disclosure. Reference is made to certain example structures and techniques and it is to be understood by a person of ordinary skill in the art that these examples and illustrations are not given in a limiting manner; rather, a person of ordinary skill in the art will recognize that the scope of the present disclosure is greater than specific embodiments and illustrations.

Figure 1:
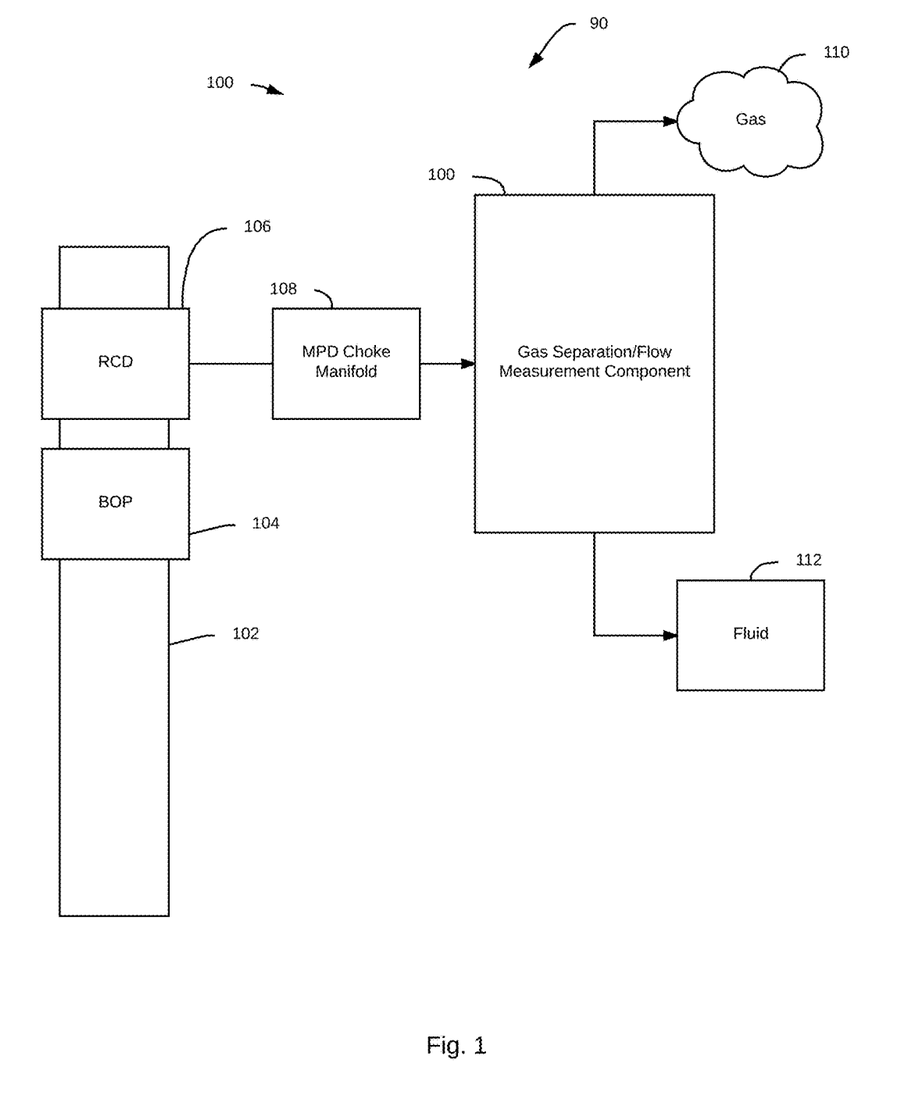
FIG. 1 is a schematic illustration of an environment 90 for a gas separation/flow measurement component according to embodiments of the present disclosure.

FIG. 1 is a schematic illustration of an environment 90 for a gas separation/flow measurement component 100 according to embodiments of the present disclosure. The gas separation/flow measurement component 100 will be referred to herein as a separation component 100 without loss of generality. A multi-phase flow is produced during many operations, including drilling, completions, etc. The environment shown in FIG. 1 includes a pipe 102 carrying a multi-phase flow from a formation. The environment 90 can also include a blowout preventer (BOP) 104 comprising a large valve at the top of a well that may be closed if the drilling crew loses control of formation fluids. By closing this valve a drilling crew can regain control of the reservoir, and procedures can then be initiated to increase the mud density until it is possible to open the BOP 104 and retain pressure control of the formation. The environment 90 can also include a rotating control device (RCD) 106, which can be a pressure-control device used during drilling for the purpose of making a seal around a drillstring (not shown) while the drillstring rotates. The RCD is intended to contain hydrocarbons or other wellbore fluids and prevent their release to the atmosphere. These components deliver a flow of multi-phase fluid to a managed pressure drilling (MPD) choke manifold 108. MPD 108 is a technique using an adaptive drilling method used to precisely control the annular pressure throughout a wellbore. After determining the downhole pressure environment, drillers manage wellbore pressure constrained by the limits of formation properties. The annular pressure is kept slightly above the pore pressure to prevent the influx of formation fluids into the wellbore, but it is maintained well below the fracture initiation pressure. Rapid corrective actions can often be implemented in order to deal with observed pressure variations. The MPD process may utilize a variety of techniques including control of back pressure, adjusting mud density, modifying fluid rheology, adjusting the annular fluid level, controlling circulating friction and incorporating hole geometry in the well construction.

The use of MPD and the MPD manifold 108 to control the risks and costs of drilling wells that have narrow downhole pressure limits by actively managing the wellbore pressure profile has become a common practice. The dynamic control of annular pressures enables drilling wells that might not otherwise be practical. The MPD manifold 108 delivers the multi-phase flow to the separation component 100, where it is analyzed and separated into a gas 110 and a fluid 112 outflow.

Figure 2:
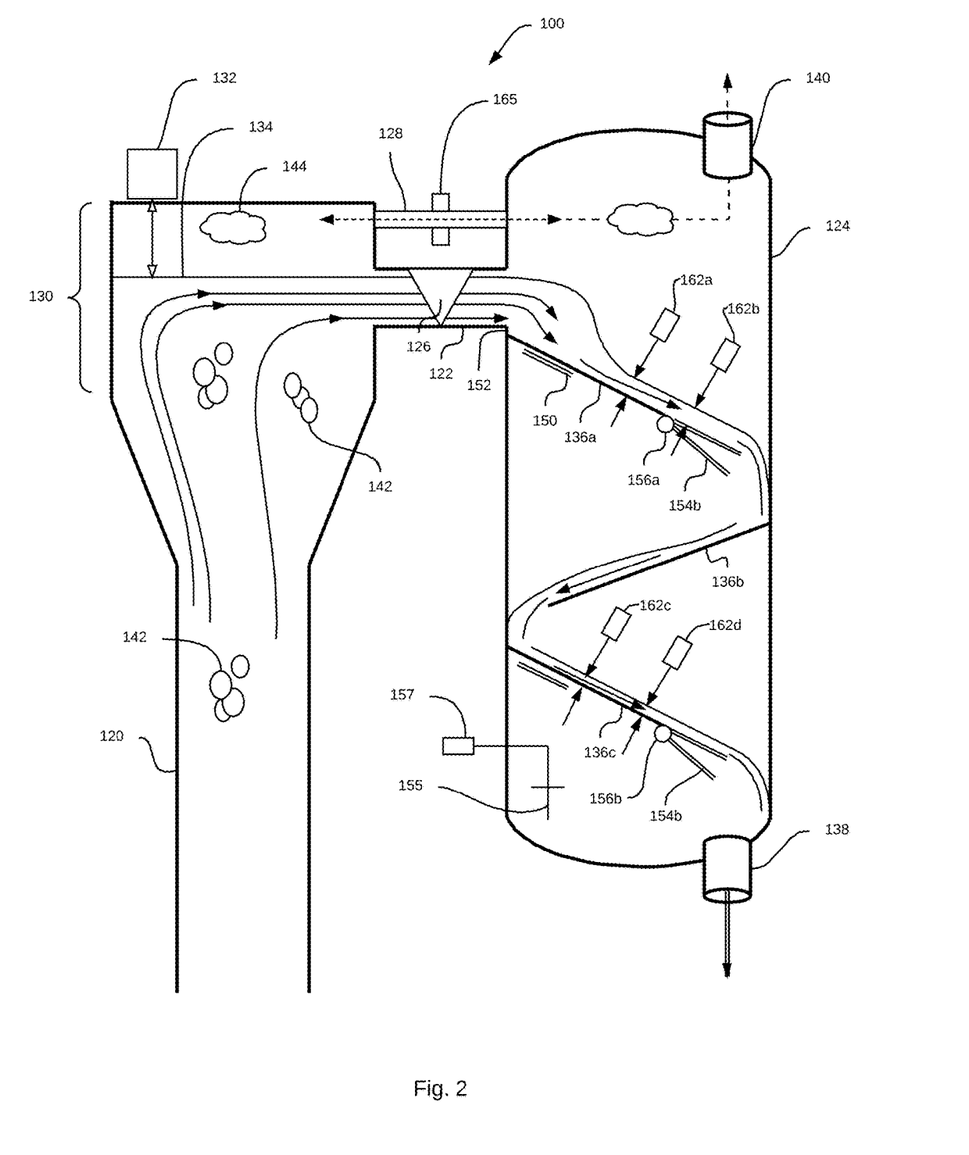
FIG. 2 is an illustration of the separation component according to embodiments of the present disclosure.

FIG. 2 is an illustration of the separation component 100 according to embodiments of the present disclosure. The separation component 100 includes a fluid supply pipe 120, a transfer pipe 122 and a mud-gas separator (MGS) 124. The transfer pipe 122 includes a barrier such as a Wier plate 126. The transfer pipe 122 can be shaped to allow fluid flow through it to be relatively thin in the vertical dimension which encourages gas to separate from the liquid of the flow. There is a gas transfer conduit 128 above the transfer pipe 122 which permits gas to flow freely between the supply pipe 120 and the MGS 124. The fluid supply pipe 120 includes a supply box 130 at an upper portion of the supply pipe 120. The supply box 130 includes a level sensor 132 configured to measure a distance from the top of the supply box 130 to the surface 134 of the multi-phase flow introduced through the fluid supply pipe 120. The MGS 124 has one or more baffles 136a, 136b, and 136c. There is a fluid outlet 138 at a base of the MGS 124, and a gas outlet 140 at a top of the MGS 124.

The fluid supply pipe 120 provides a multi-phase flow received from the MPD manifold 108 shown in FIG. 1. The multi-phase flow can include mud, oil, water, gas, and cuttings or other detritus usually present in a drilling operation or another oilfield operation. The fluid supply pipe 120 is oriented with a substantial vertical component. In FIG. 2, the supply pipe 120 is vertical, although in other embodiments there is a horizontal component to the orientation of the fluid supply pipe 120. Pressure in the multi-phase flow causes the flow to have an upper surface 134 which is raised above the level of the transfer pipe 122 such that fluid flows through the transfer pipe 122, through the Weir plate 126, and into the MGS 124. Within the multi-phase flow are gas bubbles 142 which are encouraged to exit the multi-phase flow from the upper surface 134 and congregate above the surface 134 as shown by the gas cloud 144. This gas is permitted to pass between the supply box 130 and the MGS 124 through the gas transfer conduit 128 and ultimately out of the MGS 124 through the outlet 140. The supply box 130 can be constructed having certain dimensions to encourage effective gas separation and to promote a steady flow through the Weir plate 126. The top surface of the fluid is maintained level due to the dimensions of the supply box 130. The multi-phase fluid flow allows gas bubbles to exit the flow, and by exiting they can cause disturbances in the surface. The enlarged supply box 130 mitigates these disturbances and allows the flow to remain steady, and stable. The vertical variances in the level of the flow are minimized which allows for more reliable measurements as the fluid continues onward through the MGS 124. In some embodiments, the area of the surface 134 is such that the flow remains steady.

The vertical component of the fluid supply pipe 120 ensures establishment of a velocity profile for the fluid. The size of the supply box 130 ensures that the flow is calm and steady as it reaches the exposed fluid surface 134 and begins to flow into the MGS 124. The Weir plate 126 can be square or triangular as shown.

Figure 3:
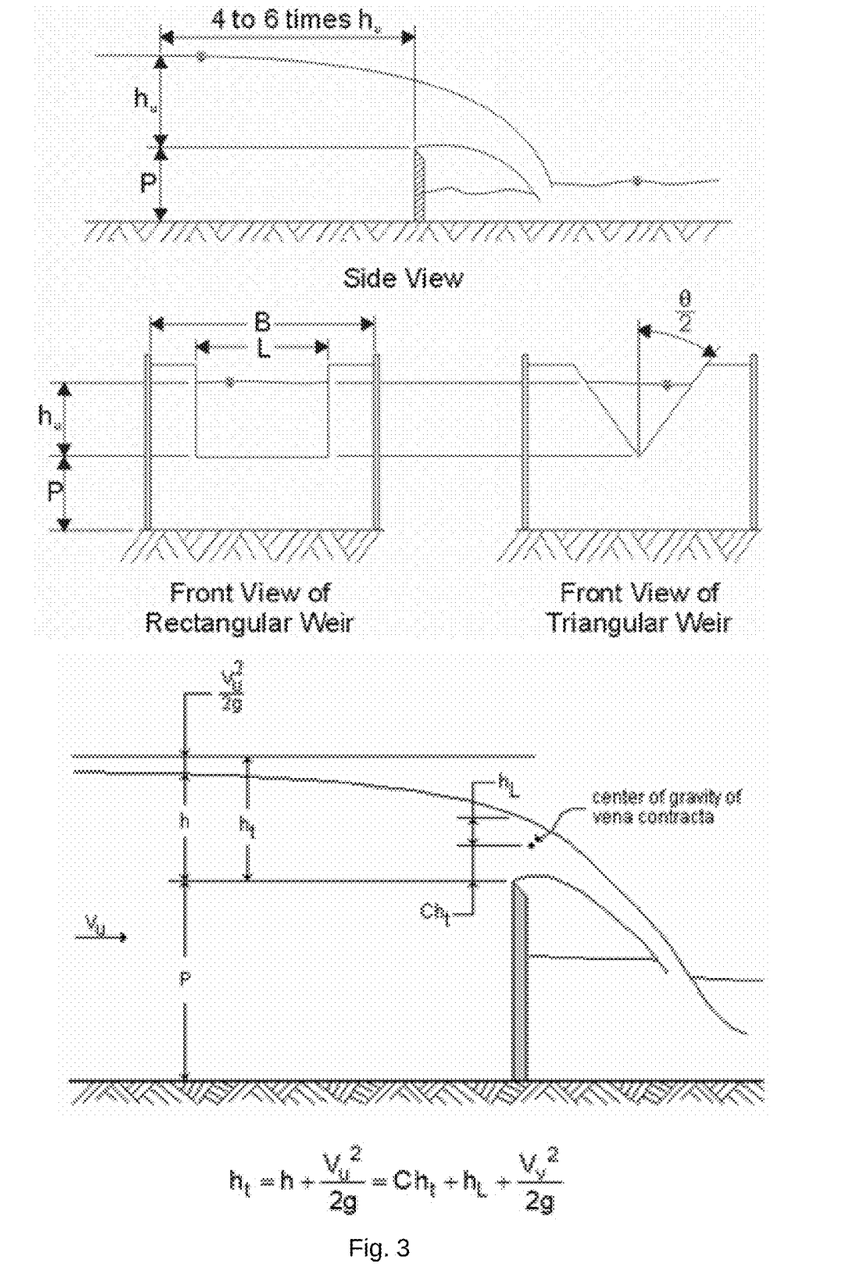
FIG. 3 shows some dimensions and parameters for use with horizontal and triangular Weirs.

FIG. 3 shows some dimensions and parameters for use with horizontal and triangular Weirs. For a horizontal-crested rectangular weir, where A=hL, the calculation of flow rate, Q, can be found using the following equation:

$$Q = C_d L \sqrt{t} \approx C_d L^{3/2}$$

In the case of a triangular, or V-notch Weir, where $$A = {}^2\tan\left(\frac{\theta}{2}\right),$$

the calculation of flow rate, Q, can be found using the following equation:

$$Q = C_d L \left(\frac{\theta}{2}\right) \sqrt[2]{t} \approx C_d \tan\left(\frac{\theta}{2}\right)^{5/2}$$

When considering such relation for weir plates, it can be observed that the fluid density does not affect the flowrate, as the density affect in a linear way the potential energy in the supply region to the weir plate and also the kinetic energy of the flow falling through the weir plate. If the fluid contains gas bubbles which are entrained by the fluid through the weir plate opening as the same velocity, the system would so determine the total flowrate. Such two-phase flow measurement applies for gas bubble moving horizontally as the same velocity than the liquid. This is particularly applied for small bubbles and with viscous fluid. The gas which escapes from the multi-phase flow in the supply box 130 to the MGS 124 via the pipe 128 may be measured by a gas flowmeter 165. Such flowmeter may be an ultra-sonic time of flight measurement system.

Referring back to FIG. 2, the multi-phase fluid cascades downward under force of gravity over the baffles 136a-136c and can collect at the bottom of the MGS 124 or it can be selectively allowed to leave the MGS 124 via the fluid outlet 138. As the fluid cascades over the baffles, gas continues to separate from the fluid and continues to collect at the top and to exit the gas outlet 140. With reference to the first baffle 136a, there is a force sensor 150 at the higher portion of the baffle 136a that is configured to measure and record the force imparted to the baffle 136a from the falling fluid flow. There can be many force sensors 150 positioned along the baffle 136a or on another suitable portion of the MGS 124. There can be a vertical drop 152 from the base of the transfer pipe 122 to the baffle 136a which enables the force sensor 150 to measure the impact of the falling fluid, taking into consideration the vertical drop 152. In some embodiments the vertical drop 152 may not be purely vertical and may have some horizontal component. In some embodiments the vertical drop 152 is negligible. The baffle 136a can have a generally consistent slope along its length. In some embodiments the baffle 136a can include an articulated portion 154a which rotates about a fulcrum 156a. The articulated portion 154 is shown in two positions to illustrate the movement. The system may be equipped with one or more level sensors 162a, 162b, and 162c to measure the fluid level above the plate 154. There can be a second fulcrum 156b and articulated portion 154b on a second baffle 136b or 136c. The difference in slope allows for yet another calculation to be made on the fluid flow according to the two-rheological model with two parameters: the depth of the fluid as it flows along the baffle 136a and the angle of the articulated portion 154. This measurement and calculation can be made according to the Bingham plastic law or the power law. The same measurement can be made at any point along any of the baffles 136a, 136b, or 136c.

Figure 4:
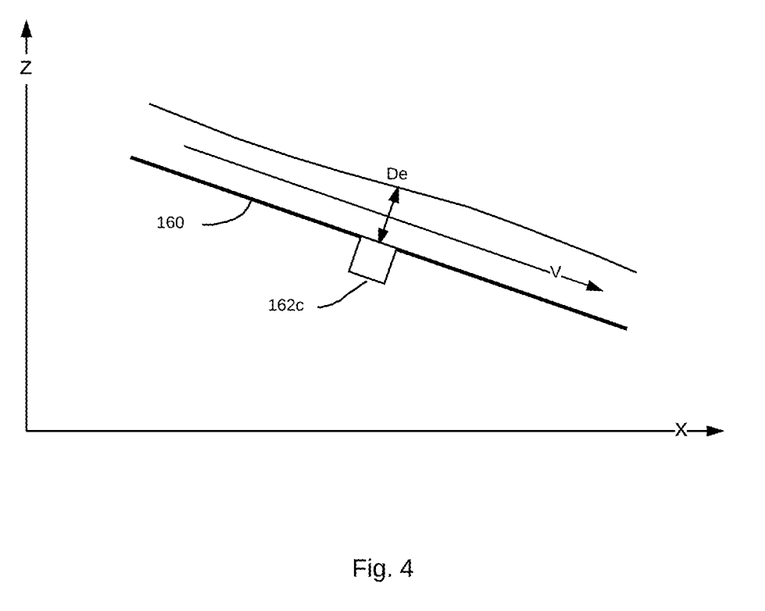
FIG. 4 is a diagram of a measurement to be carried out according to embodiments of the present disclosure including a sloped baffle and a level sensor.

FIG. 4 is a diagram of a measurement to be carried out according to embodiments of the present disclosure including a sloped baffle 160 and a level sensor 162. The level sensor 162c can be positioned at various points along the flow path of the multi-phase fluid flow in the separation component 100. It can be used to measure the depth of the flowing fluid using the following equation:

$$V = \frac{De^2}{3\mu} \rho g \frac{dz}{dx}$$

Where:
V=average velocity
De=max depth of the flowing channel
ρ=fluid density
μ=fluid viscosity
z=vertical coordinate
x=axial coordinate along the flow channel.

The fluid level may be obtained by measurement of the layer of fluid above the baffle plate (such as 162c of FIG. 4. Such sensor could be based on inductance or capacitance measurements or even pulsed ultra-sonic detector. In other applications, the fluid level above the baffle plate 154 may be obtained by distance sensor 162a or 162c or even 132 which measure the gap between the sensor face and the surface of the fluid, allowing to determine the correct level of fluid.

Using these calculations, the flow rate from within the transfer pipe 122 through the Weir plate 126 can provide an estimation of flow rate. The force sensor 150 (also referred to as a target sensor) can provide an estimate of fluid density p. The level measurement 162a above the baffle 136a can provide an estimation of apparent viscosity, where $$\frac{dz}{dx}$$

is the slope of the baffle plate 160 which is defined by the construction of the MGS 124.

The additional feature of the articulating plate 154 provides yet another measurement, which enables use of the "two rheological model" with two parameters. For such application, the level sensor 162b can be installed above this articulating plate 154. This can be achieved using the Bingham plastic law or the power law. In some embodiments there is a second baffle having force sensors and an articulation. FIG. 2 shows baffle 136c as having these features. In some embodiments, the first and last of the baffles can have these additional features. In other embodiments all the baffles can have one or more of the force sensor and the articulating portion. Identical (or similar) instrumentation on two or more of the baffles may be installed such as the first and last baffles (IE, such as the baffle 136a and baffle 136c), it is possible to determine the gas extraction performed within the MGS 124: the density would increase for the last plate, as gas would escape from the fluid. Also, the rheology may be affected: the fluid may appears more viscous. In yet further embodiments the baffles can be formed in a spiral, continuous downward slope.

The MGS 124 shown in FIG. 2 can also be used to determine how much material is held within the MGS 124. Of course, the weight of the empty MGS 124 is known ahead of time, and with the estimation of mass flow rate through the MGS 124, the weight of the fluid passing through the MGS 124 in a steady-state operation can be estimated. The difference between these two numbers and the operating weight of the MGS 124 at steady-state flow operation will yield the weight of any detritus that has collected within the MGS 124. Another method for determining the amount of accumulated material is to use a level sensor 155 operated by a controller 157. The level sensor may be a vibrating 155 which can be made to vibrate to move the material and thus achieve a measurement of how much material there is. In other embodiments, the level sensor 155 can be an electrode operated by the controller 157 and configured to electrically (through capacitance or resistance) determine the quantity of material in the MGS 124.

Figure 5:
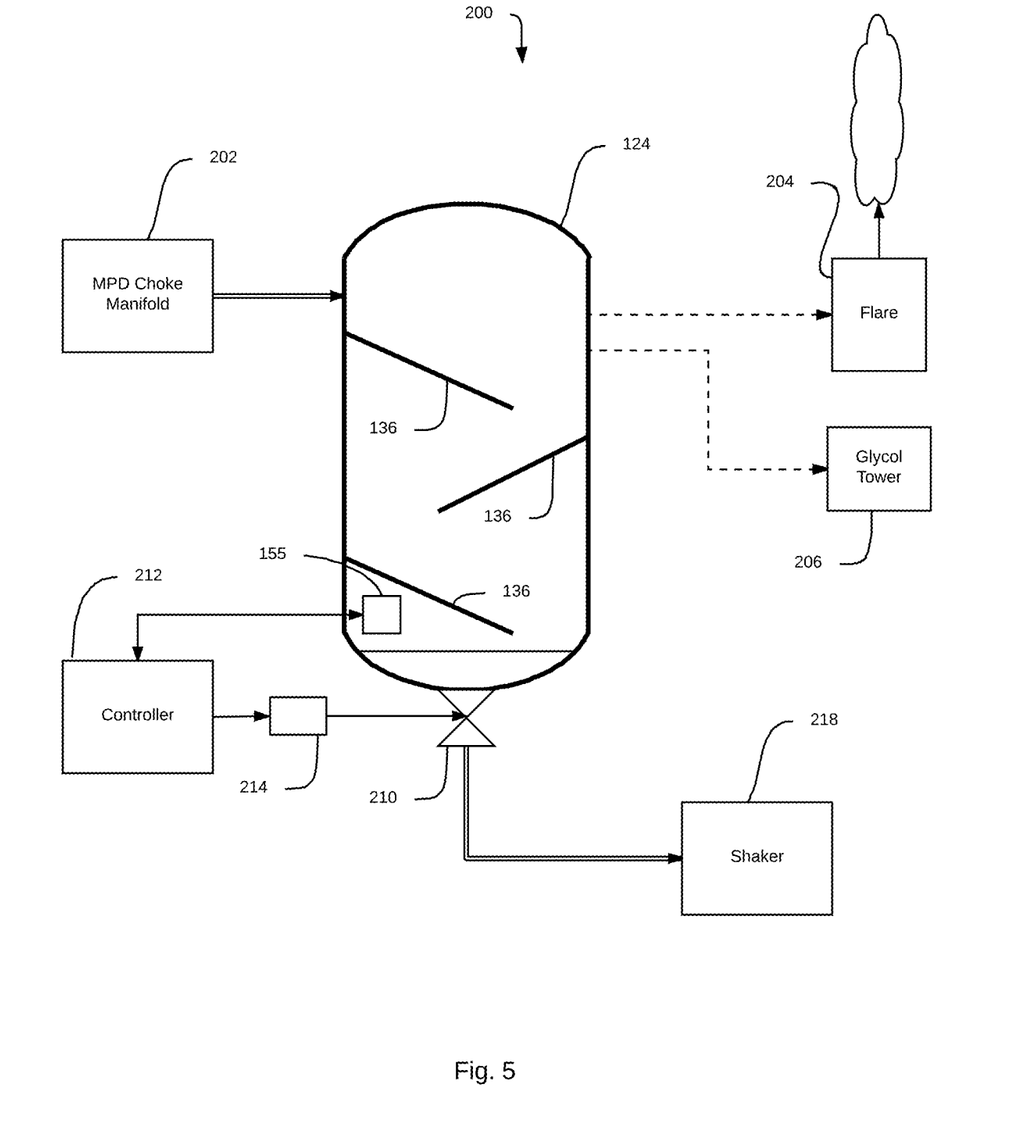
FIG. 5 is a schematic illustration of a mud-gas separator as part of a separation component according to embodiments of the present disclosure.

FIG. 5 is a schematic illustration of a MGS 124 as part of a separation component 200 according to embodiments of the present disclosure. The separation component 200 can receive a multi-phase fluid from a MPD Manifold 202, similar to that described elsewhere herein. The multi-phase fluid can be fed into the MGS 124 through a fluid supply pipe that is not shown in FIG. 5. The MGS 124 has baffles 136 which help to encourage gas to migrate out of the fluid and naturally upward to the top of the MGS 124. The gas can be delivered to a flare unit 204 to be burned away or otherwise disposed of. In other embodiments, the gas can be delivered to a glycol tower 206 for drying and other treatment wherein the gas eventually reaches production. The MGS 124 can also have a level sensor 155 capable of measuring a level of fluid within the MGS 124. The MGS 124 can have a valve 210 at the bottom. The separation component 200 includes a controller 212 and an actuator 214 operatively coupled to the valve 210 and to the level sensor 208. When the level of fluid 216 reaches a predetermined height, the controller 212 can instruct the actuator 214 to open the valve 210 to release some of the fluid from the MGS 124 and into a shaker 218. The valve 210 can have a grate or another equivalent mechanical means to prevent debris from clogging the valve 210. The controller 212 and level sensor 208 can help to avoid a situation that may be caused when too much gas builds up within the MGS 124 in which excessive pressure drop in the flare line causes gas to exit the MGS through the valve 210 and into the shaker 218. In other conventional embodiments in which there is no valve 210, the excessive pressure drop in the flare line (between 124 and 204) can cause the gas to push the fluid level downwards in the MGS 124 with risk that the gas reach the shaker 218 or other downstream components. With the embodiment of FIG. 5, the controller 212 and level sensor 208 prevent such occurrence by opening and closing the valve 210 to keep the fluid level in the proper range of level.

Figure 6:
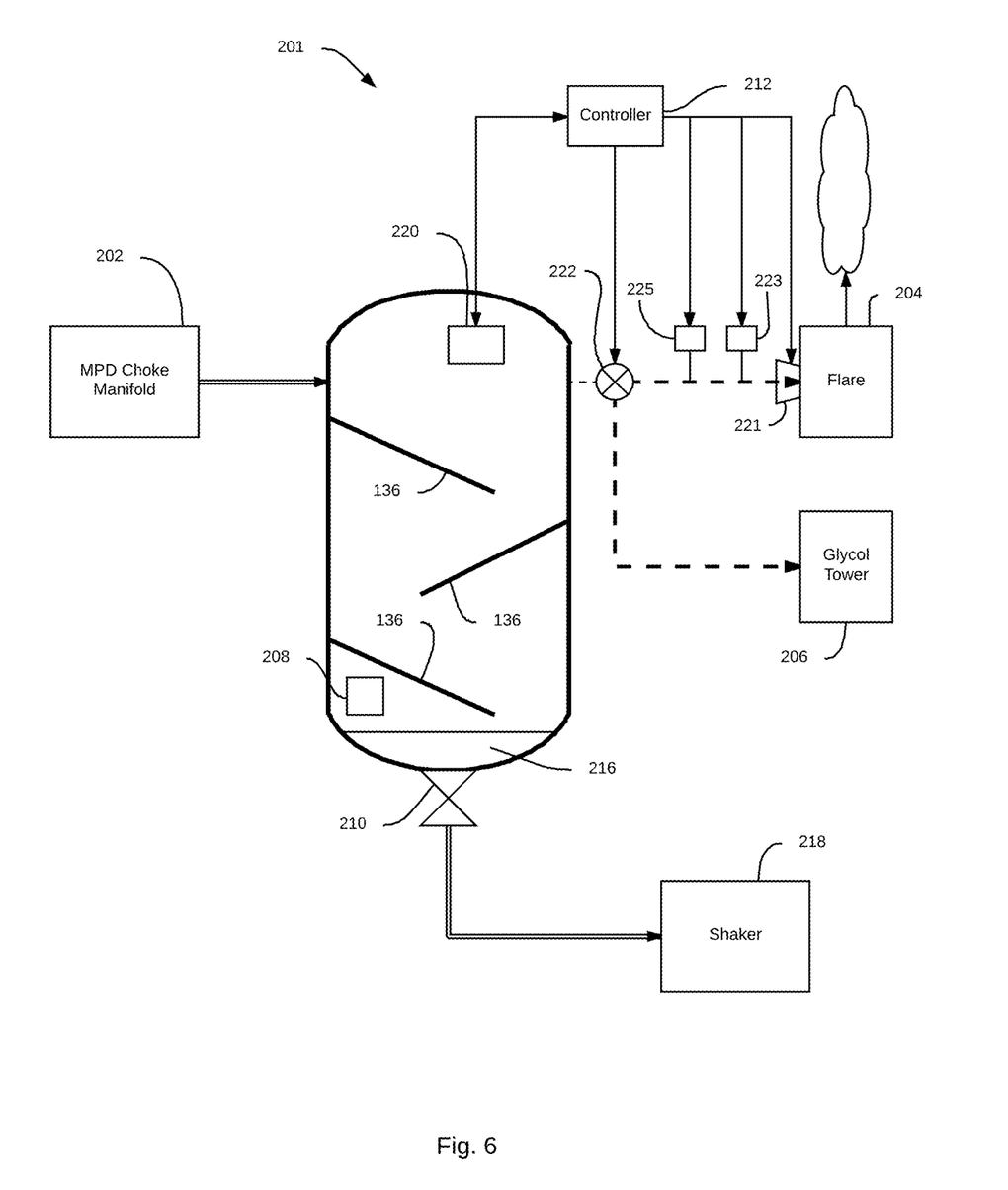
FIG. 6 is a schematic illustration of a separation component according to embodiments of the present disclosure.

FIG. 6 is a schematic illustration of a separation component 201 according to embodiments of the present disclosure. Some features of this separation component 201 are generally analogous to components from FIG. 5. The separation component 201 includes a MGS 124 which separates and measures fluid and gas as discussed in detail above. This separation component 201 further includes a pressure sensor 220 within the MGS 124. The sensor 220 can be any suitable type of pressure sensor and can be positioned within or without the MGS 124 and is configured to measure a pressure in the gas inside the MGS 124. The pressure sensor 220 is coupled to a controller 212. The separation component 201 also includes a compressor 222 in fluid communication with the gas exiting the MGS 124. The compressor 222 can deliver the gas to the flare 204 or to a glycol tower 206 or to another production line. If the pressure within the MGS 124 reaches a certain threshold some gas can be moved through the compressor 222 and delivered to its next destination. In some embodiments the compressor 222 can selectively deliver the gas to a flare 204 or a glycol tower 206. The pressure within the MGS 124 is also related to the level of fluid within the MGS 124. The separation component 201 includes a level sensor 208 for measuring the level of fluid 216 within the MGS 124. In some embodiments the pressure sensor 220 can eliminate the need for the level sensor 208. In other embodiments the pressure sensor 220 and level sensor 208 are both in communication with the controller 212 which can also communicate with the valve 210 to permit selective opening and closing of the valve to release fluid from the MGS 124.

Furthermore, the line to flare system may be terminated by a nozzle 221. Through such nozzle, the pressure may accelerate the gas to a sonic or even super-sonic velocity. Such high velocity provides an excellent method to entrain air so that the fuel/oxygen ratio is better and allows a cleaner combustion of the gas at the flare. The compressor may be controlled by the controller 212 in relation with the measurement of a pressure gauge 223 coupled between the compressor 222 and the flare 204 and the setting on the choke (in the case of variable gas nozzle 221). With optimum setting of the nozzle 221 versus the pressure gauge 223, the fuel/oxygen can be optimized. Also, the usage of nozzle 221 operating above the sonic velocity acts as a flame arrester. This insures that the flame cannot move inside the gas supply line back to the inside of the MGS 124. Such situation may exist at start of the MGS 124, as the inside of the MGS 124 is initially filled with air. So, the initial gas flow through the compressor 222 towards the nozzle 221 is a mixture of flammable gas and air (oxygen) with the potential risk of the flame moving back from the flare towards the inside of the MGS 124 (which should be monitored for explosion).

Furthermore, the compressor 222 may also be designed and operated as partial vacuum pump. It such application, the pressure inside the MGS 124 (measured by the pressure gauge 220) may be low, helping the extraction of gas out of the supplied fluid. If the gas is not in solution (but in bubble), the bubble increases in size and float faster to surface to escape the fluid. In the gas is in solution, the low pressure may provoke some de-absorption. For such operation at low pressure in the MGS 124, the valve 210 can be coordinated with the level measurement 208 by the controller 212.

Also the gas present inside the MGS 124 and line towards the flare stack may be monitored for presence of toxic gas (such as H2S). In such case, a pilot flame may be activated (turned ON) at the flare to insure safe handling of such gas (by combustion). The MGS gas line to the flare 204 may also include a gas analyzer 225 to determine the ratio of C1, C2, C3, and C4. Such analysis may be obtain by optical absorption of specific wavelength to determine the presence (and concentration) of each type of molecules. This analysis may be useful to estimate the content of gas emitted by some down-hole formations. This information is also valuable to determine the optimum the air ration to entrain for optimum burning at the flare.

Figure 7:
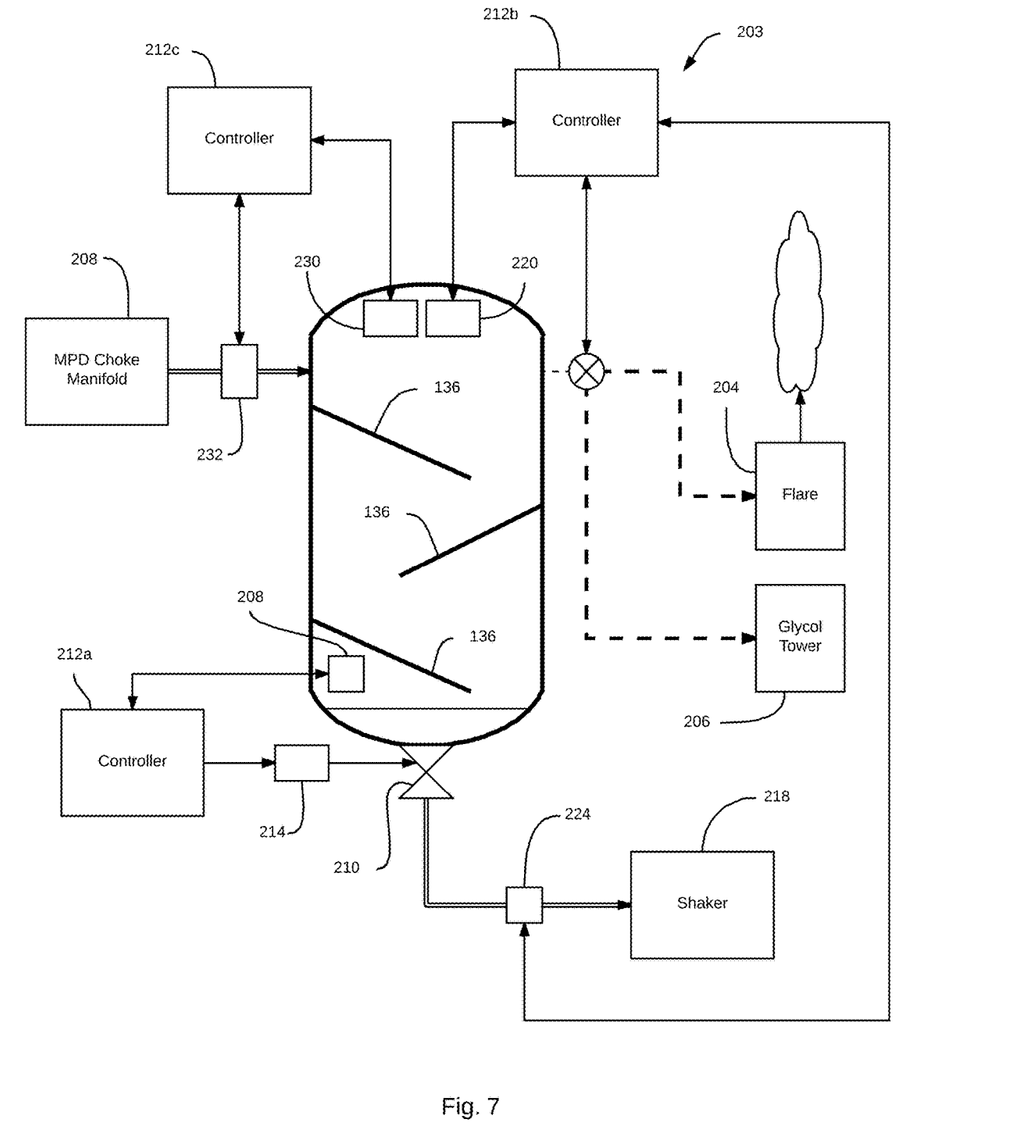
FIG. 7 shows yet another separation component according to still further embodiments of the present disclosure.

FIG. 7 shows yet another separation component 203 according to still further embodiments of the present disclosure. The separation component 203 includes several features generally analogous to features from FIGS. 5 and 6, and further includes a temperatures sensor 230 positioned within the MGS 124, a controller 212*c*, and a heater 232 operatively coupled to the controller 212*c* and capable of heating the incoming multi-phase fluid flow. The temperature sensor 230 prevents the heater 232 from overheating the gas within the MGS 124. Certain predetermined temperature limits can be set to prevent overheating. Heating the incoming multi-phase fluid flow encourages the gas to migrate out of the flow. Referring to FIG. 2, the heater 232 can be positioned on the fluid supply pipe 120 before reaching the supply box 130.

The separation component 203 includes several features generally analogous to features from FIGS. 5 and 6. Some embodiments can include one or more of these components in any combination as will be understood by a person of ordinary skill in the art. For example, a separation component according to the present disclosure may include the temperature sensor and heater and not the compressor 222. A single controller can be used to control each of the level sensor and valve, pressure sensor and compressor, or the temperature sensor and heater. In other embodiments, each of these systems can have a dedicated controller. The separation component 203 can also include a PVT (pressure, volume, temperature) cell 224 positioned and configured to measure characteristics of the outgoing fluid flow from the MGS 124 to the shaker 218. This data is used by the controller 212*b* to determine whether or not to operate the compressor 222 to allow or prevent gas from escaping from the MGS 124, or to selectively pump gas from the MGS 124 according to the needs at a given time.

The systems and methods of the present disclosure enable a multi-phase fluid flow to be separated, gas from liquid, and measured for parameters according to Bingham's law, the power law, or another suitable calculation, without the need for an expensive VX flowmeter or another similarly expensive component.

The invention claimed is:

1. A method of measuring characteristics of a fluid in a multi-phase solution, comprising:
    conducting a multi-phase solution in a vertical direction such that the multi-phase solution forms an upwardly-facing, steady fluid surface;
    flowing the multi-phase solution laterally through a transfer pipe, wherein the transfer pipe is at least partially blocked by a barrier;
    measuring the level of fluid in the pipe of flow in a vertical direction;
    flowing the multi-phase solution over one or more baffles positioned at a downwardly sloping angle, wherein one or more of the baffles is equipped with a force sensor;
    measuring a kinetic energy within the multi-phase fluid flow falling onto at least one of the baffles equipped with a force sensor;
    measuring a depth of the multi-phase fluid as it flows over the baffles in at least one location; and
    allowing gas to escape the multi-phase solution and collecting the escaped gas.

2. The method of claim 1 wherein the barrier comprises at least one of a triangular Weir plate and a rectangular Weir plate.

3. The method of claim 1, further comprising a volumetric flow rate of the multi-phase solution as it flows over the barrier.

4. The method of claim 1, further comprising calculating falling fluid kinetic energy.

5. The method of claim 4, further comprising determining a fluid density of the multi-phase fluid.

6. The method of claim 4, further comprising determining an apparent viscosity of the multi-phase solution for a given flow condition above one or more of the baffles.

7. The method of claim 4, further comprising articulating a portion of at least one of the baffles to predetermined angle and allowing a different flow condition for the same flow rate.

8. The method of claim 7, further comprising determining a rheological model for the multi-phase solution using the measured depth and the various angles.

* * * * *